C. P. ZIMMERMAN.
WEIGHING SCALE.
APPLICATION FILED AUG. 26, 1909.
998,066.
Patented July 18, 1911.
2 SHEETS—SHEET 1.
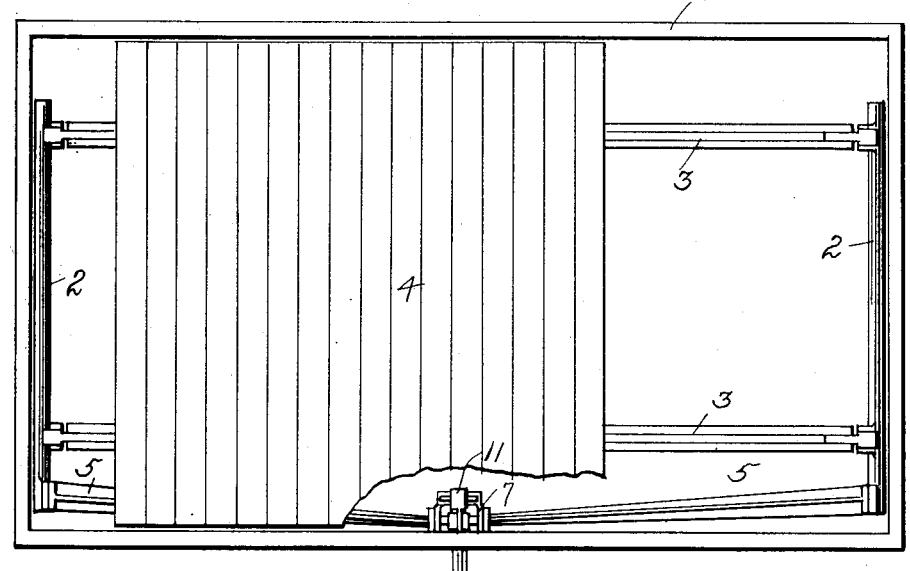
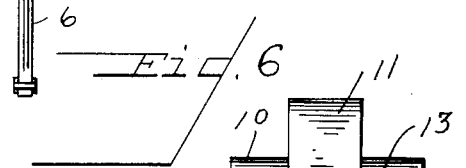
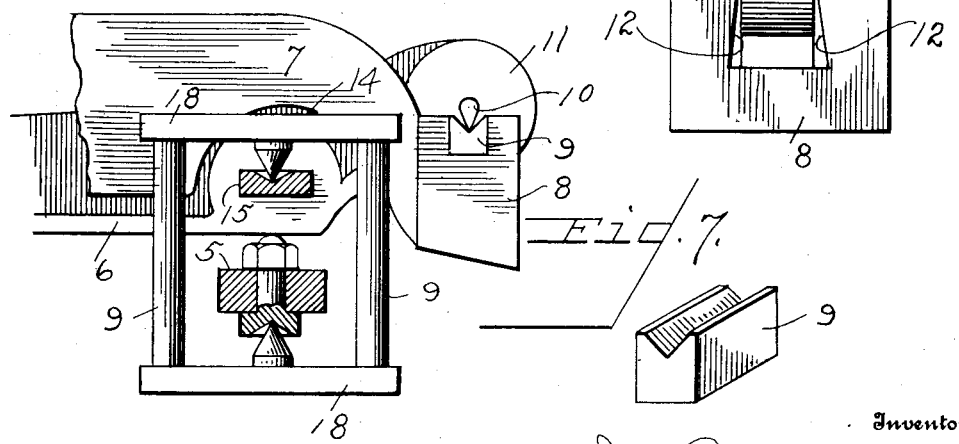
Witnesses
Inventor
By Attorney

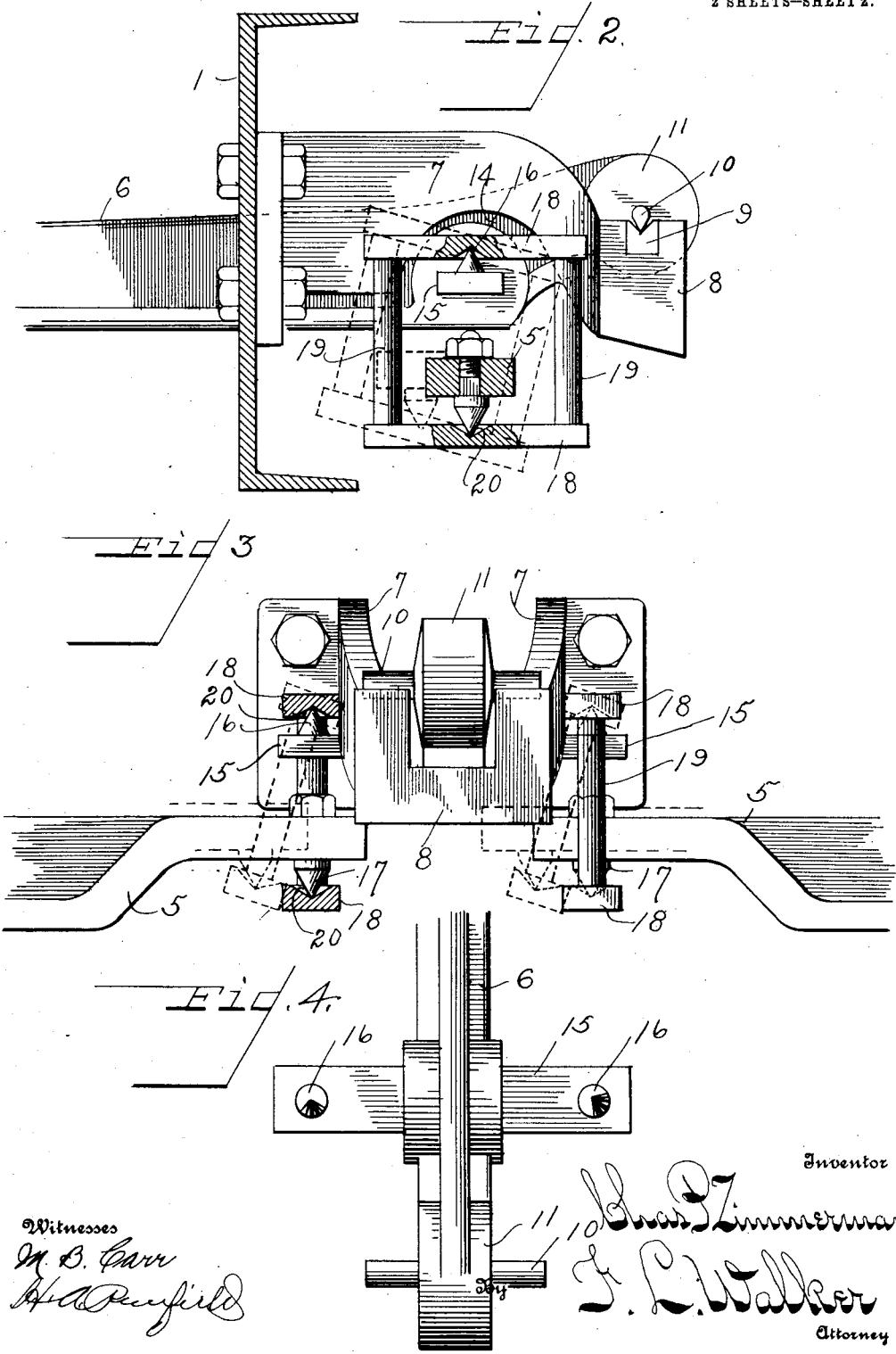

UNITED STATES PATENT OFFICE.

CHARLES P. ZIMMERMAN, OF DAYTON, OHIO, ASSIGNOR TO THE DAYTON PITLESS SCALE COMPANY, OF DAYTON, OHIO, A CORPORATION OF OHIO.

WEIGHING-SCALE.

998,066. Specification of Letters Patent. Patented July 18, 1911.

Application filed August 26, 1909. Serial No. 514,738.

*To all whom it may concern:*

Be it known that I, CHARLES P. ZIMMERMAN, a citizen of the United States, residing at Dayton, in the county of Montgomery and State of Ohio, have invented certain new and useful Improvements in Weighing-Scales, of which the following is a specification.

My invention relates to weighing scales and particularly to "pitless" wagon scales.

The object of the invention is to simplify the construction as well as the means and mode of operation of such devices whereby they will not only be cheapened in construction but will be more efficient and serviceable in operation and unlikely to get out of repair, and will be substantially self-adjusting.

A further object is to provide improved connection for the cross lever whereby the scale will be rendered more sensitive and the cross lever and weighing beams will be unaffected by either longitudinal or lateral oscillation of the scale platform, but will respond only to the vertical movement thereof.

With the above primary and other incidental objects in view as will more fully appear in the specification, the invention consists of the features of construction, the parts and combinations thereof and the mode of operation or their equivalents, as hereinafter described and set forth in the claims.

Referring to the drawings, Figure 1 is a plan view of the operating levers of the scale a portion of the platform being removed. Fig. 2 is a side elevation of the supporting chair or bracket for the cross lever showing the universal connection between the cross lever and the long levers. Fig. 3 is a rear elevation of the same. Fig. 4 is a detail plan view of a portion of the cross lever showing the bearing connections. Fig. 5 is a detail view of a modified form of the universal connection between the cross and long levers. Fig. 6 is a modification of the bearing support for the cross lever. Fig. 7 is a detail perspective view of one of the hardened bearing blocks.

Like parts are indicated by similar characters of reference throughout the several views.

The present invention relates particularly to the supporting and operating connections of the cross lever. As usually constructed, the longitudinal and lateral oscillations of the scale platform, due to the vibration caused by driving a wagon over the scale or by placing heavy structures on the scale to be weighed, causes a corresponding vibration of the fifth lever in its bearings and a vibration or tremor of the weighing beams, which not only renders the operation of weighing more difficult and less accurate but also causes considerable wear on the knife edge bearings of the cross lever and weighing beams and tends to throw the scale out of balance. To overcome this difficulty is one of the primary objects of the present invention.

Referring to the drawings, 1 is a scale frame which may be formed of channel irons or of wood or concrete as desired. Supported upon the rectangular frame 1 by the usual swinging bearings, not shown, are the lateral rock shafts 2 upon which are carried the floor beams 3. Located on the floor beams 3 is the usual floor of planks 4. Extending inward from each of the rock shafts 2 are the usual long levers 5. The construction thus far is the ordinary scale construction and forms no part of the present invention. On account of the swinging connections of the rock shafts 2 as usually employed, the platform is capable of longitudinal and lateral oscillation or vibrations in addition to its vertical movement by which the weight of commodities placed thereon is determined.

Secured to one of the side members of the rectangular frame 1 is a supporting chair or bracket for the cross lever 6 comprising two inward extending substantially parallel arms 7 connected at their inner extremity by an integral U-shaped yoke 8. The upper faces of the arms of the U-shaped yoke 8 are recessed, in which recesses are inserted hardened steel blocks 9 having V-shaped grooves in their upper surface as shown in Fig. 7 to be engaged by the knife edge bearings 10 of the cross lever 6. The cross lever 6 terminates in a head 11 from the opposite sides of which the knife edge bearings 10 project. In order to reduce the friction, should the cross lever be displaced laterally, the opposite faces of the head 11 are relieved adjacent to the periphery thereof whereby the faces are formed slightly conical. By this construction the cross lever can only contact with the inner faces of the respective arms of the U-shaped yoke 8 throughout a very limited area adjacent to the knife edge bearing thereby reducing the frictional resistance and increasing the sensitiveness of the scale. A modification of this feature is shown in Fig. 6 in which the opposite sides of the head 11 of the fifth lever are formed flat while the inner faces of the arms of the U-shaped yoke 8 are inclined or undercut as at 12 whereby the arms can only engage the faces of the head 11 at their upper edge 13, the frictional surface thereby being reduced to minimum. The side arms 7 of the supporting bracket or chair are recessed at 14 and the fifth lever 6 is provided with opposite extending arms 15 which project through the recess 14 of the arms 7 extending laterally beyond the supporting chair or bracket and carrying at their extremities conical studs 16. The inner extremity of the long levers 5 are each provided with similar conical or pointed studs 17. The conical studs 16 of the cross lever 6 and the conical studs 17 of the long levers 5 are oppositely disposed in relation to each other or project in opposite directions. A clevis comprising horizontal parallel bars 18 and vertical parallel connecting rods 19 is provided. Conical recesses or depressions 20 are provided in the inner faces of each of the horizontal bars 18 of the clevis which depressions form bearing seats for the respective studs 16 and 17. By means of this construction the long levers 5 may be oscillated either laterally or longitudinally. When oscillated laterally, the connecting clevis will swing on the bearing studs 16 and 17 as shown by dotted lines in Fig. 2, to compensate for such variation. While upon a longitudinal oscillation of the long levers, the clevis will swing as shown by dotted lines in Fig. 3. It is usual to connect the supporting clevis with the cross lever by means of a knife edge bearing such as the bearing 10. However, such a connection will permit the clevis to swing in but one direction; that is, when moved by the lateral movement of the long levers. Upon a longitudinal oscillation of the long levers the supporting clevis in the usual construction is raised at one side or the other out of engagement with the knife edge bearing which soon results in the knife edge bearing becoming unduly worn and thereby affecting the sensitiveness of the scale. It frequently happens in such a construction that the knife edge bearings are entirely unseated and in such a construction the oscillation of the long levers causes a corresponding vibration of the cross lever. With the construction above described employing two oppositely disposed conical studs instead of knife edge bearings, the connecting clevis is free to swing in any direction and forms substantially a universal connection between the long levers and the cross lever which permits the oscillation of the long levers in any direction except vertical, without transmitting the vibration to the fifth lever and there is little or no liability of displacing the clevis upon the bearing studs. The vertical movement of the long levers will be transmitted to the cross lever regardless of their lateral or longitudinal vibration the lever responding only to the vertical movement and not to the lateral or longitudinal movement. The supporting bracket or chair being carried entirely upon the main frame 1 and independent of the scale platform permits the cross lever to respond more readily to any vertical variation of the scale platform while the universal connection of the clevis obviates any undue vibration or tremor.

From the above description it will be apparent that there is thus produced a construction embodying the particular features of advantage before enumerated as desirable but which obviously is susceptible of modification in its form, detail construction and arrangement of parts without departing from the principle involved or sacrificing any of its advantages.

Having thus described my invention I claim:

1. In a weighing scale the combination with a main frame, a platform, and platform levers, of a cross lever, a supporting bracket therefor having bearings in which the cross lever is fulcrumed, oppositely extending lateral arms carried by the cross lever said arms projecting in opposite directions to points removed from and beyond the supporting bracket, upward projecting pointed studs carried by the lateral arms at points removed from and outside the supporting bracket, converging long levers forming a part of the system of platform levers and terminating at points removed from and outside the supporting brackets, downward projecting pointed studs carried by the long levers, clevises located at opposite sides of the supporting brackets and removed therefrom having depressed bearing seats in the inner periphery thereof at diametrically opposite points in which the respective upward and downward projecting studs are engaged whereby the platform levers may oscillate in any direction in a horizontal plane independent of the cross lever, substantially as specified.

2. In a weighing scale, the platform, the rock shafts on which the platform is supported, converging levers projecting from the rock shafts, supporting members having fulcrum bearings thereon, a cross lever fulcrumed on said supporting members, the adjacent faces of the cross lever and supporting members being non parallel, whereby the frictional engaging surfaces thereof will be reduced to minimum, oppositely disposed lateral arms carried by the cross lever projecting to points beyond the supporting members, upward projecting bearing pins carried by the lateral arms at points removed from and beyond the supporting members, clevises suspended on said bearing pins outside the supporting members, downward projecting bearing pins carried in the converging platform levers engaging the bottom of the clevises, substantially as specified.

3. In a weighing scale as described, the combination with a main frame, a platform and platform levers, of a cross lever, a supporting bracket therefor secured to and carried by the main frame, comprising two parallel inward projecting arms, a U-shaped yoke connecting the inner ends of said arms, the yoke being provided with bearing surfaces for the cross lever, a head on the cross lever, the opposite faces of the head being formed slightly conical, knife edge bearings projecting in opposite directions from the apecii of the opposite conical faces and engaging bearing surfaces on said yoke, substantially as specified.

In testimony whereof, I have hereunto set my hand this 21st day of August A. D. 1909.

CHARLES P. ZIMMERMAN.

Witnesses:
HARVEY F. NOLAN,
F. L. WALKER.

---

Copies of this patent may be obtained for five cents each, by addressing the "Commissioner of Patents, Washington, D. C."